US006865506B1

(12) United States Patent
Escobar et al.

(10) Patent No.: US 6,865,506 B1
(45) Date of Patent: Mar. 8, 2005

(54) COMPUTER SYSTEM HAVING DRIVE TEMPERATURE SELF-ADJUSTMENT FOR TEMPERATURE-SENSITIVE MEASUREMENTS

(75) Inventors: Jorge F. Escobar, San Jose, CA (US); Andrei Khurshudov, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/675,286

(22) Filed: Sep. 30, 2003

(51) Int. Cl.[7] .............................................. G06F 15/00
(52) U.S. Cl. .................................. 702/130; 702/127
(58) Field of Search ...................... 374/100; 360/97.02; 700/1, 28; 702/85, 99, 127, 130, 132

(56) References Cited

U.S. PATENT DOCUMENTS

| | | | | |
|---|---|---|---|---|
| 5,115,225 A | * | 5/1992 | Dao et al. ..................... | 340/584 |
| 5,420,730 A | * | 5/1995 | Moon et al. .................. | 360/77.08 |
| 5,566,077 A | * | 10/1996 | Kulakowski et al. ......... | 700/299 |
| 5,721,837 A | * | 2/1998 | Kikinis et al. ................ | 710/303 |
| 5,764,430 A | * | 6/1998 | Ottesen et al. ............... | 360/73.03 |
| 6,029,119 A | * | 2/2000 | Atkinson ...................... | 702/132 |
| 6,067,203 A | * | 5/2000 | Ottesen et al. ............... | 360/73.03 |
| 6,088,662 A | * | 7/2000 | Flinsbaugh et al. .......... | 702/132 |
| 6,134,667 A | * | 10/2000 | Suzuki et al. ................. | 713/300 |
| 6,216,235 B1 | * | 4/2001 | Thomas et al. ............... | 713/501 |
| 6,266,203 B1 | * | 7/2001 | Street et al. .................. | 360/69 |
| 6,336,080 B1 | * | 1/2002 | Atkinson ...................... | 702/132 |
| 6,487,668 B2 | * | 11/2002 | Thomas et al. ............... | 713/322 |
| 6,515,817 B1 | * | 2/2003 | Hamaguchi et al. ......... | 360/73.03 |
| 6,574,065 B1 | * | 6/2003 | Sri-Jayantha et al. ........ | 360/75 |
| 6,744,586 B2 | * | 6/2004 | Ukani et al. .................. | 360/69 |
| 6,747,838 B2 | * | 6/2004 | Korbel et al. ................. | 360/78.06 |
| 2002/0109935 A1 | * | 8/2002 | Korbel et al. ................. | 360/78.06 |

* cited by examiner

*Primary Examiner*—John Barlow
*Assistant Examiner*—Douglas N Washburn
(74) *Attorney, Agent, or Firm*—Lewis L. Nunnelley; Dillon & Yudell LLP

(57) ABSTRACT

A computer system that adjusts an internal temperature of a hard disk drive (HDD) during HDD testing. An HDD test program under the control of the computer system is performed within a pre-determined optimal test temperature range. The HDD is kept within this pre-determined test temperature range by the computer system switching HDD operation modes back and forth between a higher heat generating Rapid Seek Mode and a lower heat generating IDLE mode. The HDD is thus kept within the optimal test temperature range without the use of external heating and/or cooling devices.

15 Claims, 8 Drawing Sheets

COMPUTER SYSTEM HAVING DRIVE TEMPERATURE SELF-ADJUSTMENT FOR TEMPERATURE-SENSITIVE MEASUREMENTS

BACKGROUND OF THE INVENTION

1. Technical Field

The present invention relates in general to storage systems, and in particular disk drives. Still more particularly, the present invention relates to a computer system capable of controlling the temperature of a disk drive during testing using the disk drive's own hardware and sensors.

2. Description of the Related Art

A hard disk drive (HDD) is a digital data storage device that writes and reads data via magnetization changes of a magnetic storage disk along concentric tracks. The HDD is tested before being shipped to the customer. In addition, the customer often tests the HDD on a periodic basis after the HDD is operational. The HDD can be tested either for on/off failures or for gradual performance degradation.

On/off failures are failures in which an item fails, such as a cable breaks, a disk does not spin, a read/write head does not function at all, etc. Such failures are easy to identify and locate, but may require putting the HDD in an artificial condition, such as temperature extremes, high vibration, etc., that makes such an on/off failure more likely. Such conditions can cause undetected damage to the HDD, and thus on/off failure analysis has inherent limitation.

Gradual performance degradation occurs before an on/off failure. While such performance degradation may be caused by the same conditions that cause an on/off failure, evaluation of gradual performance degradation is typically performed under conditions much less severe than those that may cause an on/off failure.

Data produced by gradual performance degradation is used to conduct a predictive failure analysis. The gradual performance degradation data can be extrapolated or otherwise manipulated/evaluated to predict an ultimate on/off failure, or else an unacceptable performance degradation. This type of data extrapolation is referred to as Predictive Failure Analysis (PFA). PFA evaluates performance using either a "symptom driven" process or a "measurement driven" process.

The symptom driven process evaluates error logs. That is, when a failure in disk rotation speed, data read/writes, noise reduction, etc. occurs, an error log is generated, allowing the tester to identify the cause of the problem. Such a process is similar to an on/off failure analysis, except that the HDD has not entirely failed; rather only a partial function of the HDD has failed.

The measurement driven process detects Generalized Error Measurements (GEM), which detects changes in performance, although not necessarily functional errors. That is, a GEM may detect an increase in the distance between a read/write head and a disk surface, or an increase in noise in a digital signal read by the read/write head, but such increases do not cause a failure of the entire HDD or an HDD component, and thus are not considered "errors." Nonetheless, such GEMs are good indicators of potential problems, especially if the conditions causing the GEMs are allowed to persist or increase. For example, if the distance between the read/write head and disk surface (known as the "flying height" of the head) increases beyond an expected tolerance as the operating temperature of the disk surface increases, then a failure can be predicted if the temperature continues to rise beyond the normal operating temperature or remains at the normal operating temperature for an extended period of time.

Test condition parameters, including temperature, required during the detection of GEMs are established by a test engineer. For example, the test engineer may write a test program that measures flying height when the disk drive is operating at 30° C.±4°. In order to keep the HDD at or near this range of temperatures, various methods are used in the prior art. Most such methods include test bench heating or cooling devices, which force regulated hot or cold air across or into the HDD until the desired test temperature condition is reached. Such heaters/coolers required additional test bench footprint space, electrical outlets, feedback controls, and cost.

In addition, an operations computer may test its HDD periodically. Such testing also requires the temperature of the HDD to be within pre-determined levels during testing, typically using the HDD's on-board cooling system (fan). However, such fans can only cool, not warm up, the HDD.

What is needed, therefore, is a method for regulating the temperature of an HDD, which is being tested, without the need for and use of additional hardware.

SUMMARY OF THE INVENTION

In view of the foregoing, the present invention provides a computer system that adjusts an internal temperature of a hard disk drive (HDD) during HDD testing. An HDD test program under the control of the computer system is performed within a pre-determined optimal test temperature range. The HDD is kept within this pre-determined test temperature range by the computer system switching HDD operation modes back and forth between a higher heat generating Rapid Seek Mode and a lower heat generating IDLE mode. The HDD is thus kept within the optimal test temperature range without the use of external heating and/or cooling device.

The above, as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1b illustrates additional detail of a disk platter stack used in the HDD of FIG. 1a;

DESCRIPTION OF A PREFERRED EMBODIMENT

Figure 1A:
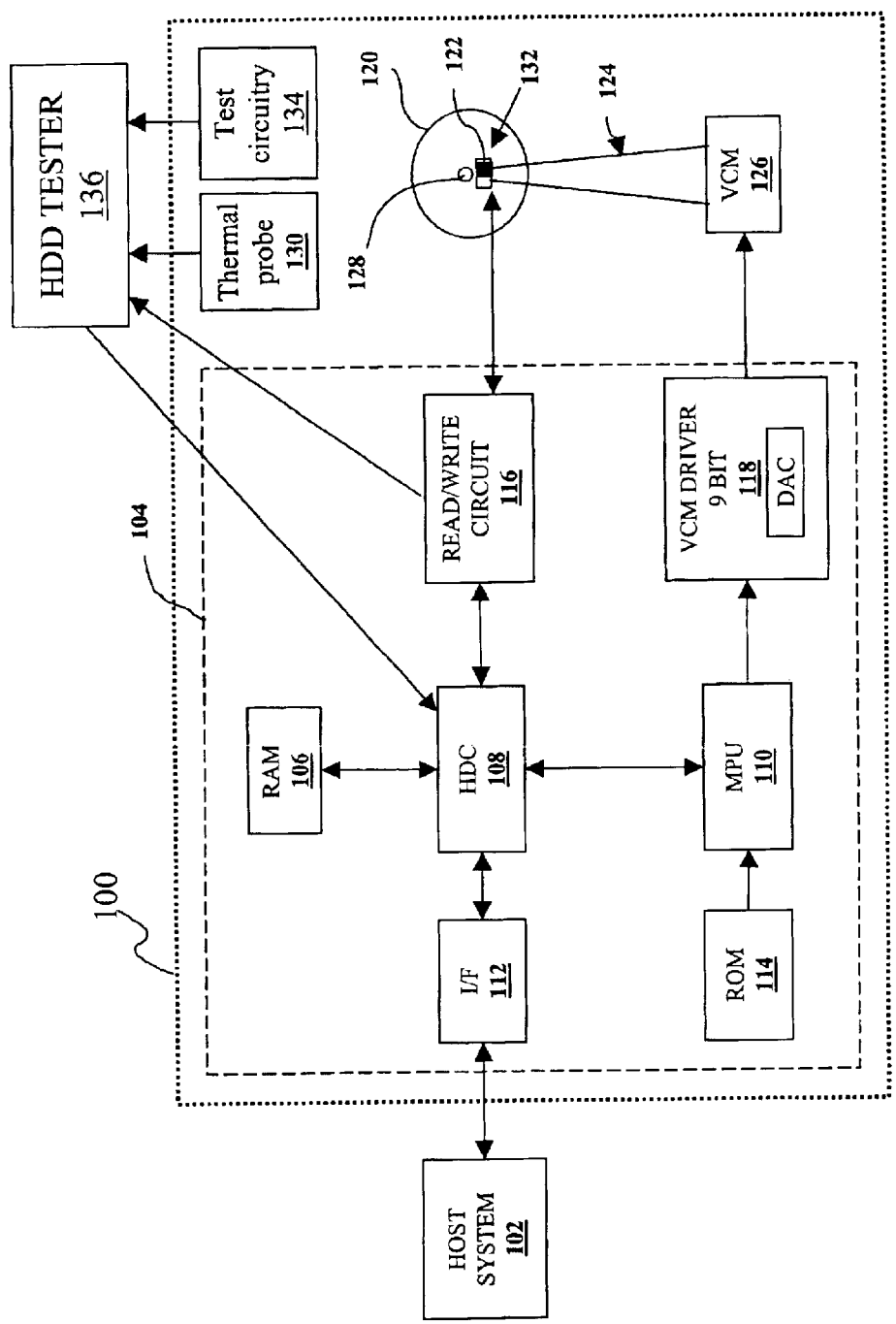
FIG. 1a depicts a preferred hard disk drive (HDD) and HDD tester used in the present invention.

With reference now to the figures and in particular FIG. 1a, there is depicted a block diagram of a hard disk drive (HDD) 100 as contemplated by the present invention. HDD 100 has a set of hard disks 120, which are rigid platters composed of a substrate and a magnetic medium. Since the substrate is non-magnetic, both sides of each hard disk 120 can be coated with the magnetic medium so that data can be stored on both sides of each hard disk 120.

An actuator arm 124 moves a slider 132, which is gimbal mounted to the actuator arm 124. The slider 132 carries a magnetic read/write head 122 to a specified lateral position above the surface of the hard disk 120 when a voice coil motor (VCM) 126 swings the actuator arm 124.

Figure 1B:
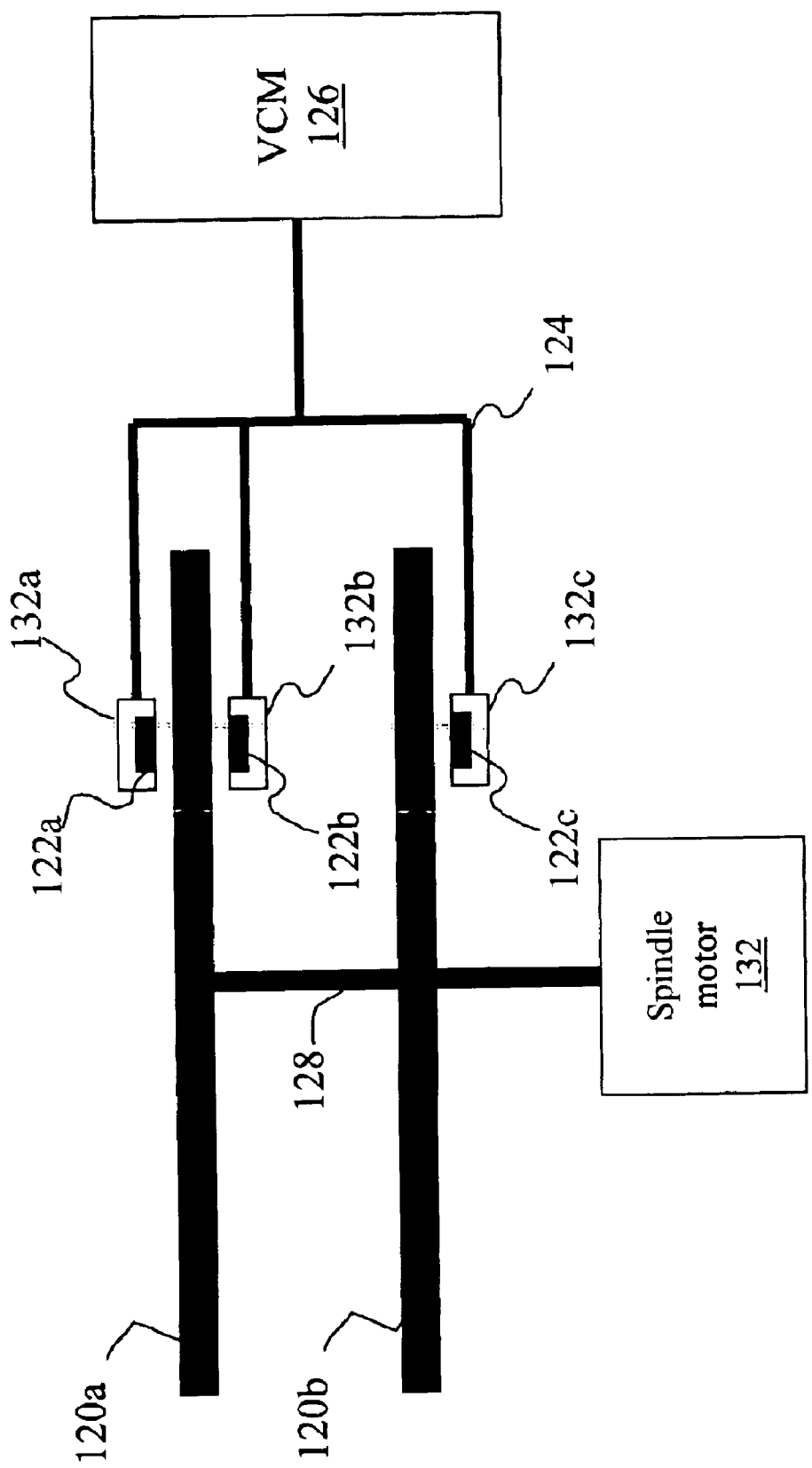

With reference now to FIG. 1b, there is depicted additional detail of hard disks 120. Hard disks 120 are a stack of hard disk platters, shown in exemplary form as hard disks 120a–b. Preferably, more than two platters are used, but only two are shown for purposes of explanation. As a spindle motor 132 turns spindle 128, each hard disk 120 connected to spindle 128 rotates at speeds in excess of 10,000 revolutions per minutes (RPMs). Each hard disk 120 has two surfaces, one or both of which can be magnetized to store data. Thus, hard disk 120a is able to store data on both sides using read/write heads 122a and 122b. Hard disk 120b stores data on only one side using read/write head 122c. Thus, the system illustrated in FIG. 1b is a two-platter three-head HDD. By swinging the actuator arm 124 (and thus causing the movement of slider 132 and read/write head 122) and rotating the spindle 128 (and thus spinning hard disk 120), read/write head 122 can be positioned above any spot above the surface of the hard disk 120.

Referring again to FIG. 1a, data reads/writes between a host system 102 and magnetic head 122 are under the control of a controller 104. Controller 104 includes an interface (I/F) 112 coupled to host system 102. Coupled to I/F 112 is a hard disk controller (HDC) 108, which coordinates read/write operations, and controls modes of operation of HDD 100, including Active Seek and IDLE Modes, about which more is discussed below.

Coupled to HDC 108 is a random access memory 106, which caches data to be read/written at hard disk 120. Read/write circuit 116 includes an analog-to-digital converter (ADC) and a digital-to-analog converter (DAC). The ADC is used to convert analog signals into digital signals for reads from the hard disk 120. The DAC is used to convert digital values into appropriate analog signals for writes to the hard disk 120. A microprocessor unit (MPU) 110, under the control of a micro-program stored in read only memory (ROM) 114, controls a VCM driver 118. VCM driver 118 controls movement of the VCM 126 using a 9-bit DAC, which converts a digital control signal from MPU 110 into an analog control signal for VCM 126. Typically, VCM driver 118 also works in coordination with a controller (not shown) for spindle 128, to provide proper positioning of read/write head 122 above the surface of hard disk 120 during read/write operations.

Testing of HDD 100 is performed under the control of a HDD tester 136. HDD tester 136 may be under the control of a standalone test computer (not shown) in a test laboratory, a program that is embedded in ROM 114, or a test program in host system 102, which is running HDD 100 under post-delivery operational conditions under the control of user or automatic hardware. HDD tester 136 samples data from read/write circuit 116, evaluating the form (amplitude, noise, etc.) as well as content (ones and zeros) of the data. HDD tester 136 also receives temperature readings from thermal probe 130, which measures the temperature inside the housing for HDD 100. HDD tester 136 also receives test data from a test circuitry 134, which includes circuitry for measuring flight height of read/write heads 122, deformation of slider 132, rotational speed of spindle 128, seek travel time of read/write heads 122, etc. HDD tester 136 is also able to control modes of operation of HDD 100, including Rapid Seek Mode and IDLE Mode, via communication with HDC 108.

As described above, HDD in an exemplary form has two seek modes: Rapid Seek and IDLE. During Rapid Seek Mode, more than 150 data seeks/second may occur. This generates a large amount of heat, mainly from current flowing through coils (not shown) in VCM 126, but also due to metal friction caused by contacts against bearings (not shown) in VCM 126. During IDLE mode, the disks continue to spin at normal operational RPM's, but VCM 126 is much less active, as there are perhaps as few as 5 data seeks/minute. This slower seek mode results in less current flowing through VCM 126, resulting in much less heat dissipation from the coils in VCM 126.

It is noted here that while the present invention uses Rapid Seek Mode and IDLE mode to illustrate different seek modes having different seek rates and heat generation/dissipation, the present invention contemplates any two seek modes having different seek rates with correlative different heat generation/dissipation levels. Thus a first seek mode is defined as any mode having a higher seek rate than a second seek mode, such that the first seek mode generates/dissipates more heat than the second seek mode. In a preferred embodiment, the first seek mode has a seek rate between 50 and 150 seeks/second, and the second seek mode has a seek rate between 1 and 50 seeks/minute.

Figure 2:
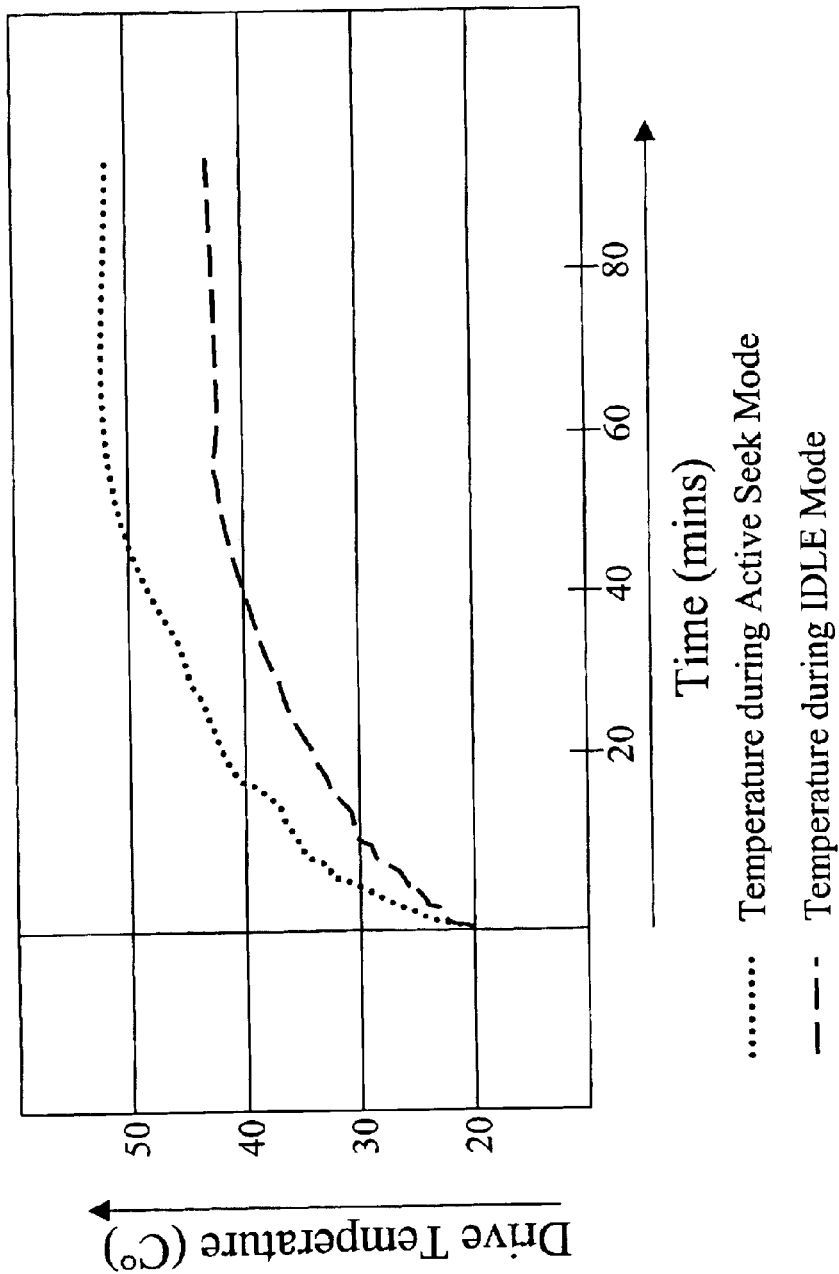
FIG. 2 is a chart of temperatures generated by different operations modes, Rapid Seek and IDLE, of the HDD.

The different amounts of heat generated by the Rapid Seek and IDLE modes are charted in FIG. 2, which depicts temperature/time curves for the Rapid Seek Mode and the IDLE mode. As shown, the Rapid Seek Mode not only generates higher ultimate levels of heat after reaching steady state (reaching about 52° C. after approximately 50 minutes), but Rapid Seek Mode also generates heat faster. Thus, the Rapid Seek Mode causes the drive temperature to reach 42° C. in only 20 minutes, compared to the IDLE Mode that causes the drive temperature to reach 42° C. in about 50 minutes.

Performance Measurement Units (PMUs) are quantified measurement units describing performance of a HDD. An exemplary PMU is IBM's Generalized Error Measurement (GEM) described above. PMUs describe performance deviations. A PMU does not represent a true error, but rather a deviation from optimal performance. Thus, PMUs are quantified for issues such as high or low read/write head flying height, signal noise from readings from the read/write head, channel noise, signal coherence, irregular signal amplification, etc.

Figure 3:
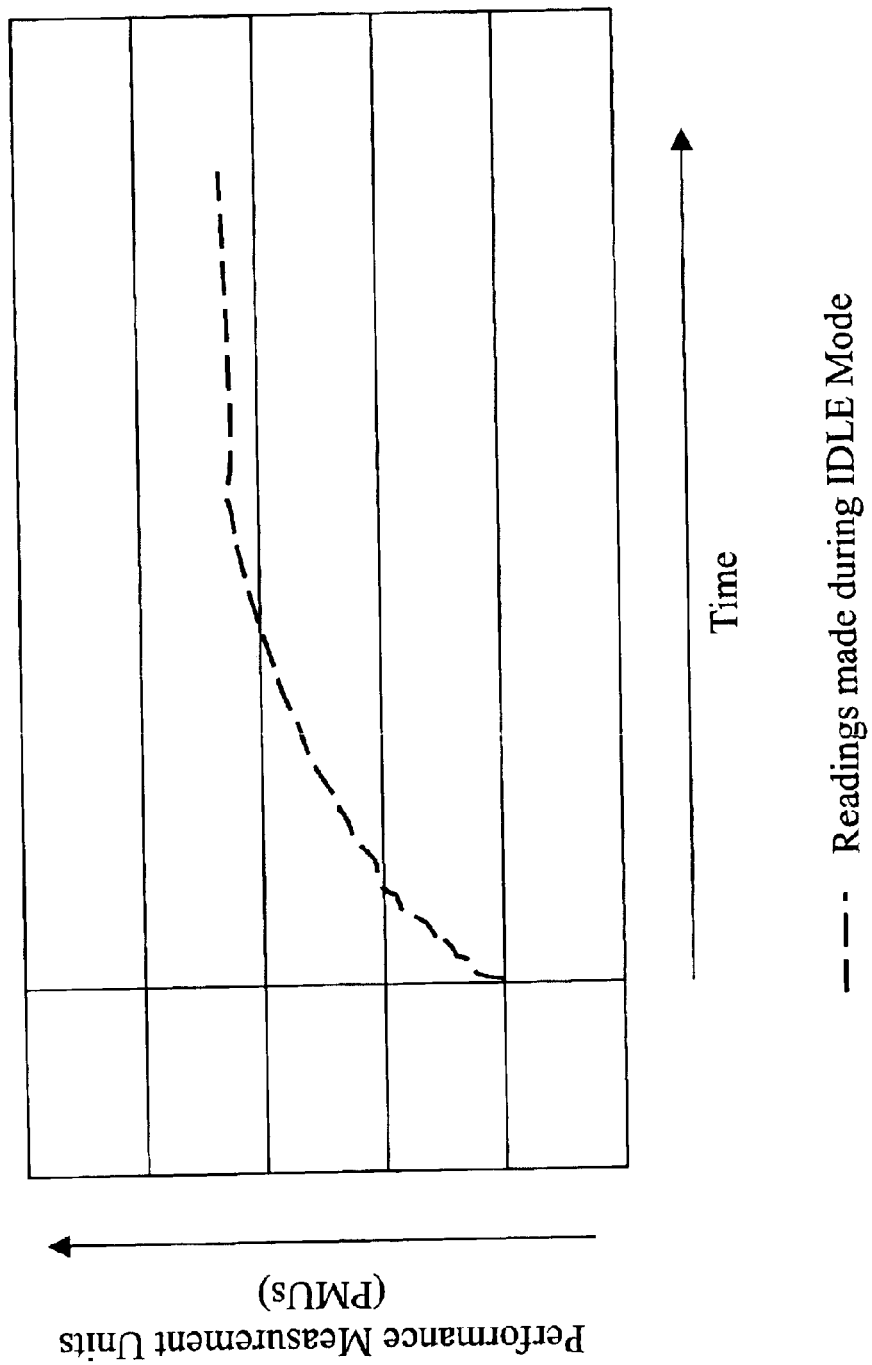
FIG. 3 is a chart showing the non-linear relationship between Performance Measurement Units (PMUs), which quantify HDD operation anomalies, and time when the HDD is in an IDLE mode of operation.
Figure 4:
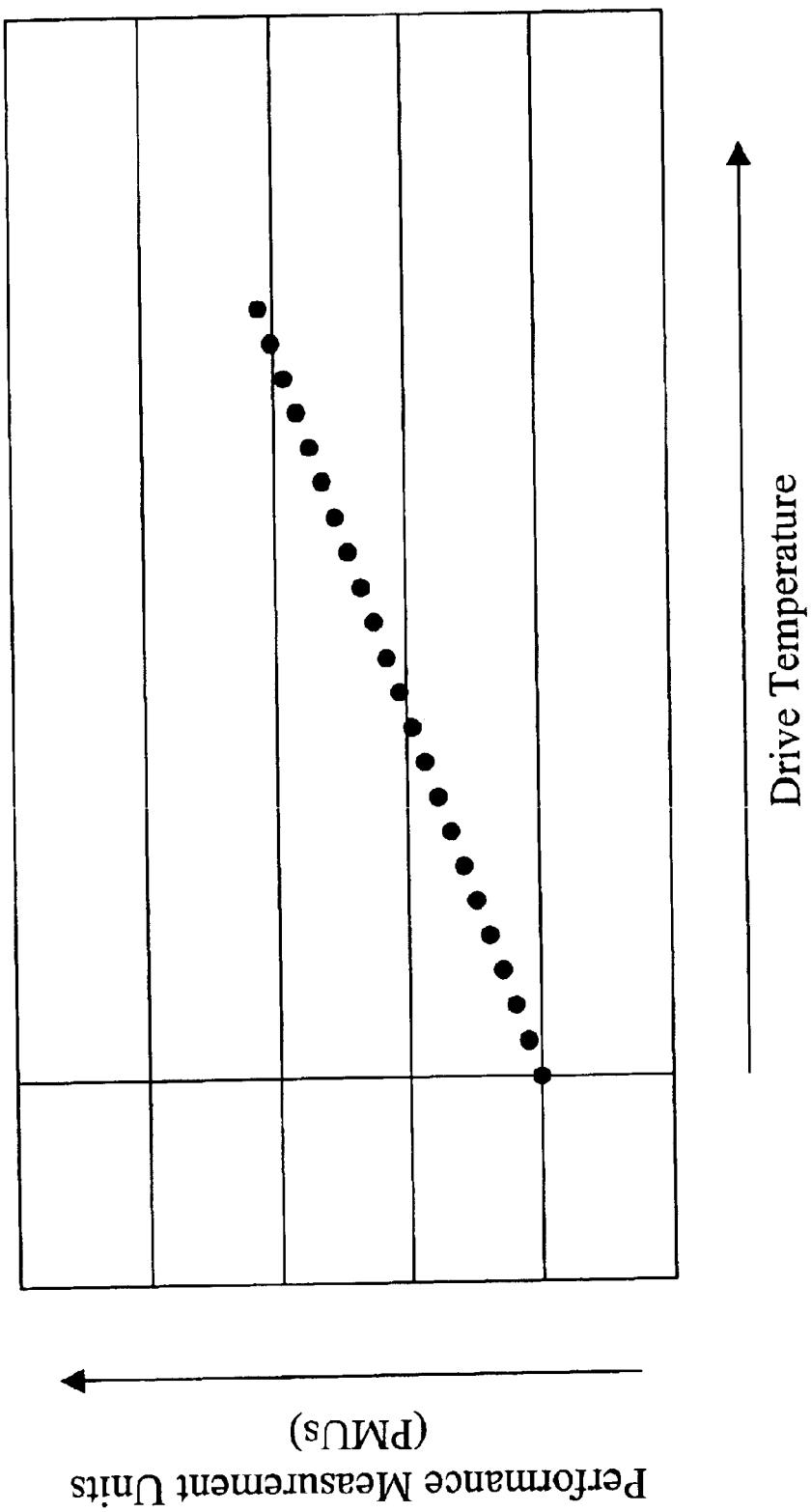
FIG. 4 is a chart showing the linear relationship between PMUs and the temperature of the HDD.

As described in the graph of FIG. 3, the number of PMUs increase during the time that the HDD is warming up. The longer the HDD is warming up, the more PMUs are generated, until the HDD reaches its steady temperature state. Thus, the graph of FIG. 3 has a linear relationship with the IDLE chart-line of FIG. 2. This relationship is described in a more manner in FIG. 4, which shows a linear correlation between the number of PMUs and the HDD temperature. This linear correlation is the same whether the HDD temperature is generated during Rapid Seek Mode or IDLE Mode.

Figure 5:
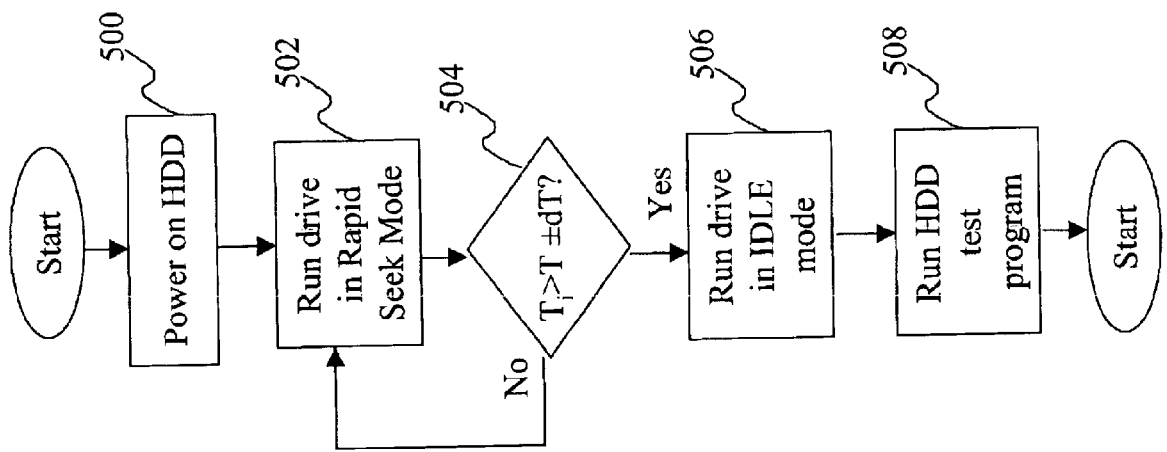
FIG. 5 is a flow chart of steps taken to rapidly increase the initial internal temperature of the HDD for testing by activating the Rapid Seek Mode of the HDD.

The present invention takes advantage of the different heat generating rates/levels of the Rapid Seek Mode and the IDLE Mode shown in FIG. 2. One method of utilizing this difference is shown in the flow-chart of FIG. 5, which depicts an HDD being initially turned on for testing (block 500). The HDD needs to be heated, as soon as possible, to a requisite test temperature range. To accomplish this heating, the HDD is initially run in Rapid Seek Mode (block 502), until the HDD actual temperature ($T_i$) reaches the desired test temperature range (query block 504), as determined by an HDD tester using a temperature probe within the HDD. This desired test temperature is defined/selected by a test program in the HDD tester. The desired test temperature range is defined as temperature "T" plus or minus acceptable deviation temperature "dT."

When running the HDD in Rapid Seek Mode has generated enough heat to reach the desired test temperature range, the HDD is then placed in IDLE mode (block 506), since the HDD test program should be performed (or in some cases must be performed) while the HDD is in IDLE mode. The HDD test program is then run (block 508). In a preferred embodiment, the test program is run at a steady-state temperature for IDLE mode. Referring back to FIG. 2, while in the IDLE mode, once the HDD reaches about 42° C., the HDD will continue to remain at this temperature as long as the HDD remains in IDLE mode. However, by initially running the HDD in the Rapid Seek Mode, this steady state temperature is reached much faster (in about 20 minutes instead of the 50 minutes it would have taken the IDLE mode). Thus, the present invention allows the HDD to warm-up to the desired HDD test temperature in a significantly shorter amount of time, thus improving test throughput and resulting in significant savings in time and money.

Figure 6:
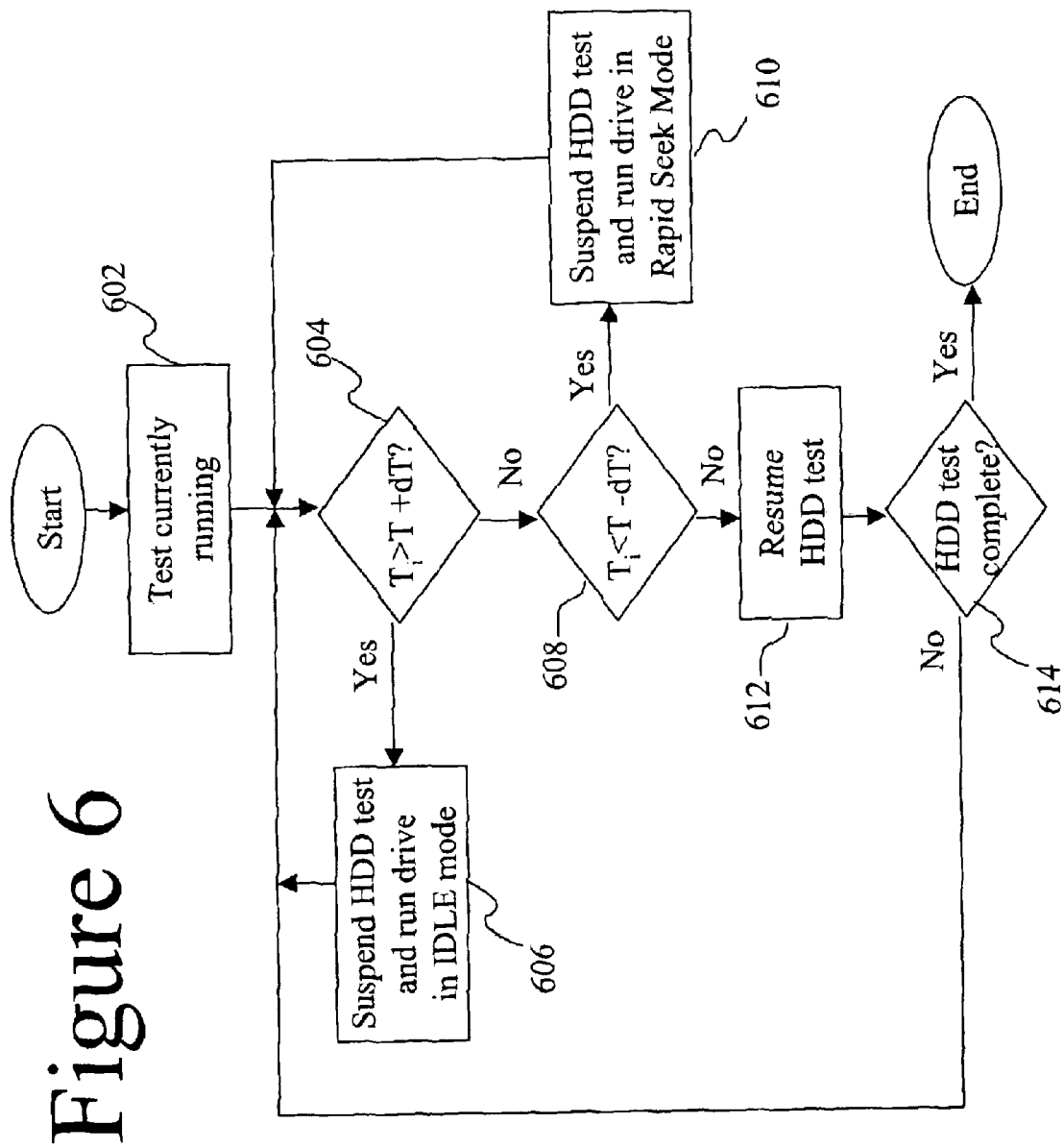
FIG. 6 is a flow chart of steps taken using the Rapid Seek and IDLE modes to maintain the internal temperature of the HDD during testing.

After reaching an optimal test temperature, it would be advantageous to maintain such an optimal test temperature, assuming that remaining in IDLE mode alone will not keep the testing temperature steady. Referring then to FIG. 6, an initial condition is assumed that the HDD test currently running in the proper test temperature range (block 602). The HDD temperature is then constantly monitored by the HDD tester using the thermal probe inside the HDD, and this internal temperature is adjusted using the Rapid Seek Mode and IDLE Modes of the HDD. If the temperature ($T_i$) of the HDD is too high (query block 604), then the HDD test program is suspended (block 606) and the HDD allowed to continue in IDLE mode until it cools down enough to resume the HDD test. If the temperature of the HDD is too low (query block 608), then the HDD test is suspended (block 610), and the HDD drive is run in Rapid Seek Mode until the HDD is warm enough to continue the HDD test. As soon as the HDD is back within the proper temperature range, then the HDD test is resumed (block 612) and continues until the HDD test is complete (query block 614).

Figure 7:
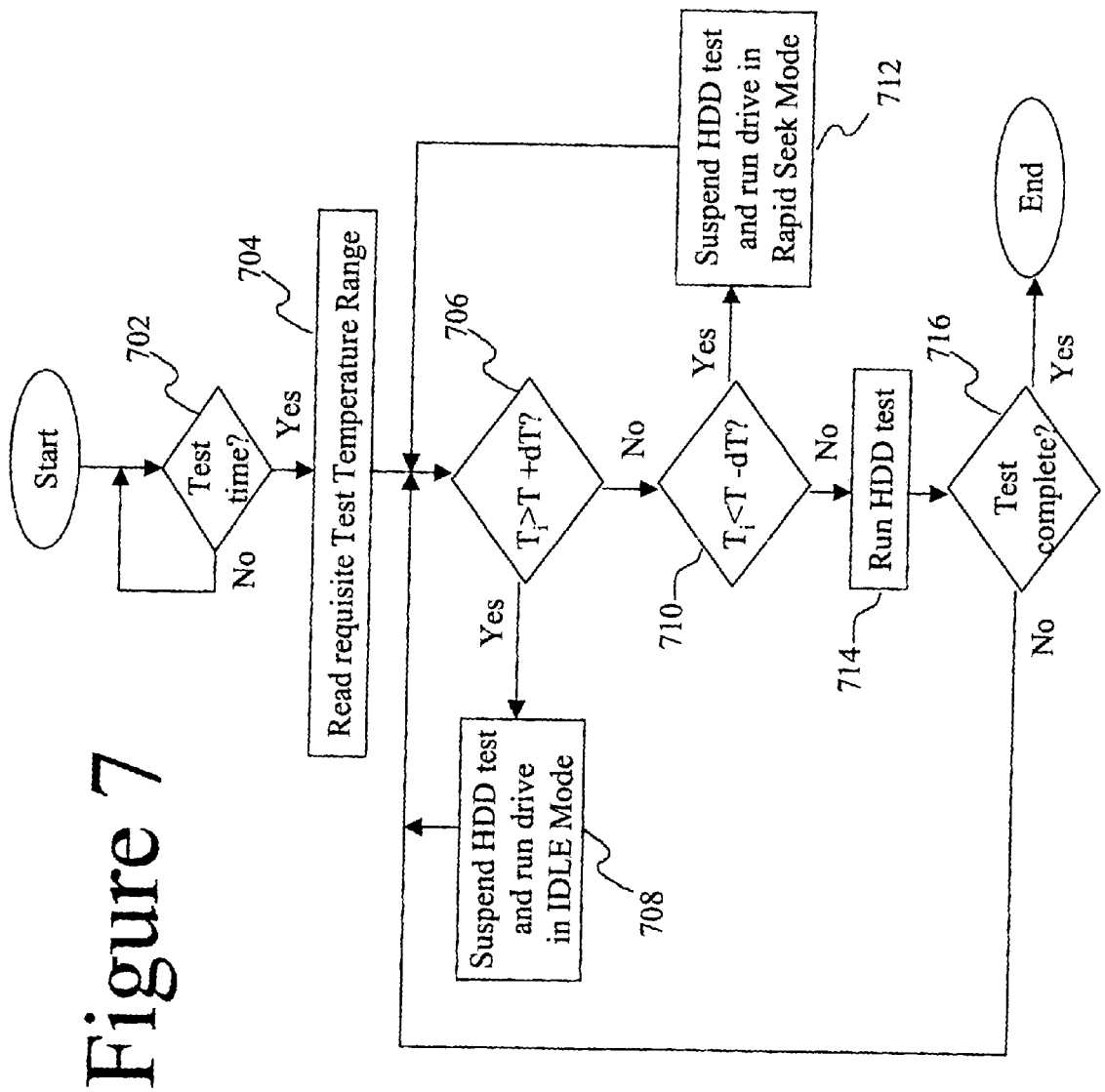
FIG. 7 is a flow chart of steps taken using the Rapid Seek and IDLE modes to ensure that the HDD is within a requisite temperature range needed to conduct a HDD test.

Periodically, an operational HDD needs to be tested. FIG. 7 describes such a situation and a preferred embodiment of the present invention. Assuming that an HDD is in normal operation in a computer system, a determination is made (query block 702) as to whether it is time to conduct an HDD test. If so, then the HDD test program reads/determines what the requisite test temperature range is for the HDD test (block 704). The HDD tester, using the temperature probe inside the HDD, compares the initial internal temperature ($T_i$) of the HDD with the requisite test temperature range (T±dT) for the HDD test program. If the initial temperature is too high (query block 706), then the HDD is put into IDLE mode (block 708) to cool down. If the initial temperature is too low (query block 710), then the HDD is put into Rapid Seek Mode (block 712) to heat up. When the HDD is in the proper temperature range, the HDD is put into IDLE mode (if not already) and the HDD test is run (block 714). The temperature is continually monitored, and the HDD test is suspended whenever the HDD temperature is outside the test temperature range (blocks 708 and 712). This monitoring/adjustment continues until the HDD test is completed (query block 716).

The present invention therefore affords a method for reaching and maintaining a desired internal temperature of a HDD during testing operations using only existing hardware and existing HDD modes of operation. By using the Rapid Seek Mode, the HDD is quickly put in condition for testing. By maintaining the HDD within the proper range of temperatures as false errors, caused by testing at an improper temperature, are avoided, and product yield is increased.

While the present invention has been described and illustrated using seek modes having different beat generation/dissipation levels, it is understood that the scope of the present invention includes the use of any two modes of HDD operation in which the HDD has two modes of operation, the first mode generating/dissipating more heat than the second mode of operation. Thus, more or less heat may be generated in different modes of operation that have different speeds of spindle motor 132, different clock/operation speeds of MPU 110, etc.

It should be further understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A data processing system having a hard disk drive having two modes of operation, the hard disk drive comprising:

means for setting a desired temperature range for a bard disk drive that is being tested;

means for, upon determining that a temperature inside the hard disk drive is below the desired temperature range, changing a mode of operation of the hard disk drive from a first mode of operation to a second mode of operation, wherein the first mode of operation generates less heat than the second mode of operation; and means for, upon determining that the temperature inside the hard disk drive is above the desired temperature range, changing the mode of operation of the hard disk drive from the second mode of operation to the first mode of operation.

2. The data processing system of claim 1, wherein the first and second modes of operation are seek modes, and wherein the first seek mode is slower than the second seek mode.

3. The data processing system of claim 1, wherein the first mode of operation is an IDLE seek mode and the second mode of operation is a rapid seek mode.

4. A data processing system of claim 1, wherein the first mode of operation has a slower disk rotation speed than the second mode of operation.

5. The data processing system of claim 1, wherein the first mode of operation has a slower clock speed than a second mode of operation for a processor within the hard disk drive.

6. A data processing system having hard disk drive capable of maintaining a steady internal temperature during testing operations of the hard disk drive, the hard disk drive having two modes of operation, the hard disk drive comprising:

means for setting a desired temperature range for a hard disk drive that is being tested;

means for, upon determining that a temperature inside the hard disk drive is below the desired temperature range, changing a mode of operation of the hard disk drive from a first mode of operation to a second mode of operation, wherein the first mode of operation generates less heat than the second mode of operation; and means for, upon determining that the temperature inside the hard disk drive is above the desired temperature range, changing the mode of operation of the hard disk drive from the second mode of operation to the first mode of operation.

7. The data processing system of claim 6, wherein the first and second modes of operation are seek modes, and wherein the first seek mode is slower than the second seek mode.

8. The data processing system of claim 6, wherein the first mode of operation is an IDLE seek mode and the second mode of operation is a rapid seek mode.

9. A data processing system of claim 6, wherein the first mode of operation has a slower disk rotation speed than the second mode of operation.

10. The data processing system of claim 6, wherein the first mode of operation has a slower clock speed than a second mode of operation for a processor within the hard disk drive.

11. A data processing system having hard disk drive capable of being rapidly warmed before testing, the bard disk drive having a first and second mode of operation, the hard disk drive comprising:

means for setting a desired temperature range for a hard disk drive that is to be tested; and means for, upon determining that a temperature inside the hard disk drive is below the desired temperature range, setting a mode of operation of the hard disk drive to a first mode of operation, wherein the first mode of operation generates more heat than a second mode of operation, until the desired temperature range is reached.

12. The data processing system of claim 11, wherein the first and second modes of operation are seek modes, and wherein the first seek mode is faster than the second seek mode.

13. The data processing system of claim 11, wherein the first mode of operation is a rapid seek mode and the second mode of operation is an IDLE seek mode.

14. The data processing system of claim 11, wherein the first mode of operation has a slower disk rotation speed than the second mode of operation.

15. The data processing system of claim 11, wherein the first mode of operation has a slower clock speed than a second mode of operation for a processor within the hard disk drive.

* * * * *

UNITED STATES PATENT AND TRADEMARK OFFICE
CERTIFICATE OF CORRECTION

PATENT NO.     : 6,865,506 B1  
DATED          : March 8, 2005  
INVENTOR(S)    : Jorge F. Escobar et al.

It is certified that error appears in the above-identified patent and that said Letters Patent is hereby corrected as shown below:

<u>Column 6,</u>  
Line 25, delete "beat" and insert -- heat --.  
Line 61, delete "bard" and insert -- hard --.

<u>Column 8,</u>  
Line 12, delete "bard" and insert -- hard --.

Signed and Sealed this

Sixteenth Day of May, 2006

JON W. DUDAS  
*Director of the United States Patent and Trademark Office*